United States Patent
Ito

(10) Patent No.: US 9,704,416 B2
(45) Date of Patent: Jul. 11, 2017

(54) TELEVISION SYSTEM AND IMAGE DISPLAY METHOD THEREOF

(71) Applicant: SAMSUNG ELECTRONICS CO., LTD., Suwon-si (KR)

(72) Inventor: Minoru Ito, Yokohama-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 637 days.

(21) Appl. No.: 14/091,868

(22) Filed: Nov. 27, 2013

(65) Prior Publication Data

US 2014/0146150 A1    May 29, 2014

(30) Foreign Application Priority Data

Nov. 29, 2012  (JP) ................... 2012-261346
Aug. 13, 2013  (KR) ................ 10-2013-0096112

(51) Int. Cl.
| | |
|---|---|
| *G09B 21/00* | (2006.01) |
| *H04N 21/4402* | (2011.01) |
| *H04N 21/4728* | (2011.01) |
| *H04N 21/485* | (2011.01) |
| *G09G 5/02* | (2006.01) |
| *H04N 9/64* | (2006.01) |
| *H04N 21/41* | (2011.01) |

(52) U.S. Cl.
CPC .......... *G09B 21/008* (2013.01); *G09G 5/026* (2013.01); *H04N 9/643* (2013.01); *H04N 21/4402* (2013.01); *H04N 21/4728* (2013.01); *H04N 21/4858* (2013.01); *H04N 21/4122* (2013.01)

(58) Field of Classification Search
CPC .................................................. G09B 21/008
USPC ............................................................ 348/62
See application file for complete search history.

(56) References Cited

U.S. PATENT DOCUMENTS 5,677,741 A * 10/1997 Yui .................... H04N 1/622
                                                         345/601
2005/0007449 A1   1/2005 Ikado
2009/0135266 A1   5/2009 Raaymakers et al.
(Continued)

FOREIGN PATENT DOCUMENTS

EP    1161085 A1   12/2001
EP    1530379 A2    5/2005
(Continued)

OTHER PUBLICATIONS

Communication dated Apr. 7, 2014, issued by the European Patent Office in counterpart European Application No. 13195037.0.

*Primary Examiner* — Yulin Sun
(74) *Attorney, Agent, or Firm* — Sughrue Mion, PLLC

(57) ABSTRACT

A television device and an image display method thereof are provided. The television devices includes an image color converter configured to generate image data, after color conversion, wherein the image data is configured for a person with a color vision deficiency for an area which is selected based on selection area information from a terminal device which selects the area or a plurality of areas from a screen layout, a display data generator configured to generate display data based on the image data and color conversion information which is generated by the image color converter, a display configured to display the display data, and a layout information extractor configured to extract layout information corresponding to the screen layout of the image data.

16 Claims, 10 Drawing Sheets

(56) References Cited

U.S. PATENT DOCUMENTS

2009/0141174 A1    6/2009   Hardacker et al.
2010/0060787 A1*   3/2010   Watanabe ............ H04N 5/4401
                                                                                            348/553

FOREIGN PATENT DOCUMENTS

| JP | 8-16129 A | 1/1996 |
| JP | 2002-14895 A | 1/2002 |
| JP | 2003-78835 A | 3/2003 |
| WO | 2004/023397 A1 | 3/2004 |
| WO | 2006/054242 A2 | 5/2006 |

* cited by examiner

TELEVISION SYSTEM AND IMAGE DISPLAY METHOD THEREOF

CROSS REFERENCE TO RELATED APPLICATIONS

This application claims priority from Japanese Patent Application No. 2012-0261346, filed on Nov. 29, 2012 in the Japanese Patent Office and Korean Patent Application No. 10-2013-0096112 filed on Aug. 13, 2013, in the Korean Intellectual Property Office, the disclosures of which are incorporated herein by reference in their entireties.

BACKGROUND

1. Field

Systems, methods and apparatuses consistent with exemplary embodiments relate to a television (TV) system and image display method thereof.

2. Description of the Related Art

A digital broadcast may be performed by compressing image or voice signals, or content information signals, and broadcasting the compressed signals by using a digital signal compression technology. The content information may include a program name, program details, a program start time, a program duration, program genre information, etc.

The television may be watched by people. Further, a normal person and a person having color vision deficiency may watch TV together.

There are digital broadcast receiving apparatuses which may allow a person having color vision deficiency to comfortably watch a data broadcast by enabling the person to more easily recognize displayed characters, etc.

However, according to such digital broadcast receiving apparatus, an image is generated for the person having color vision deficiency by performing color conversion for the entire display screen. As such, when both a person without color vision deficiency and a person with color vision deficiency watch a screen together, the person without the color vision deficiency also ends up watching color-converted images. Thus, the person without the color vision deficiency may be inconvenienced by having to watch the color-converted images.

SUMMARY

According to an aspect of an exemplary embodiment, there is provided a television device including an image color converter configured to generate image data, after color conversion, wherein the image data is configured for a person with a color vision deficiency for an area which is selected based on selection area information from a terminal device which selects the area or a plurality of areas from a screen layout, a display data generator configured to generate display data based on the image data and color conversion information which is generated at the image color converter, a display configured to display the display data, and a layout information extractor configured to extract layout information corresponding to the screen layout of the image data.

The television device of may further include a layout color converter configured to generate layout information, after color conversion, for each area of the screen layout such that a user with color vision deficiency may recognize the screen layout by using the layout information which is extracted from the layout extractor.

The terminal device may be configured to receive a user's area selection operation, and generate selection area information regarding selecting one area or a plurality of areas from the screen layout.

The television device may further include a data generator configured to generate an HTML document based on layout information after the color conversion which is generated by the layout color converter.

The television device may further include a color conversion table configured to store a color conversion rule which performs color conversion for a person with a color vision deficiency on the selected area, wherein the image color converter may be further configured to generate color conversion information based on the color conversion rule of the color conversion table.

According to an aspect of another exemplary embodiment, there is provided a television system including a television device including a display data generator configured to generate display data based on image data, a display configured to display the display data, and a layout information extractor configured to extract information regarding a screen layout from the image data as layout information, and a terminal device configured to receive a user's area selection operation and write selection area information regarding selecting one area or a plurality of areas from the screen layout, wherein the television device further includes an image color converter configured to generate image data after color conversion for a person with a color vision deficiency for image data within an area which is selected based on the selection area information from the terminal device, and wherein the display data generator is configured to generate display data based on color conversion information which is generated in the image color converter in addition to the received image data.

The television device may further include a layout color converter configured to generate layout information after color conversion of each area of the screen layout so that a user with the color vision deficiency may recognize the screen layout by using the layout information which is extracted from the layout extractor, and wherein the terminal device may further include a terminal display configured to display a color-converted screen layout based on layout information after the color conversion.

The layout color converter may be configured to generate layout information after color conversion into black and white.

The terminal device may further include an input unit configured to input a range of color conversion which is desired by a user while viewing the screen of the layout after color conversion which is displayed on the terminal display, and a detector configured to detect a block element which is included in a desired range which the user has input by using the input unit, wherein the selection area information generator is configured to generate selection area information based on the block element which is detected by the detector.

The television device may further include a data generator configured to generate an HTML document based on layout information after the color conversion which is generated by the layout color converter, and wherein the terminal display may be configured to perform a screen display using a web browser.

The television device may further include a color conversion table that stores a color conversion rule configured to perform color conversion for a person with a color vision deficiency on the selected area, and wherein the image color converter may be configured to generate color conversion information based on the color conversion rule of the color conversion table.

The terminal device may further include a terminal side color conversion table that stores a color conversion rule that is changed for each terminal device, and wherein the image color converter may be configured to generate color conversion information based on the color conversion rule that is input from the terminal side color conversion table.

According to an aspect of another exemplary embodiment, there is provided a method of displaying an image. The method includes extracting layout information corresponding to a screen layout of received image data, generating color conversion information based on a color conversion table for image data within an area that is selected based on selection area information from a terminal device that has selected at least one area of a plurality of areas from the screen layout, and generating display data based on the color conversion information and the received image data.

The method may further include generating layout information after color conversion of each area within the screen layout so that a user with a color vision deficiency may recognize the screen layout by using the layout information.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
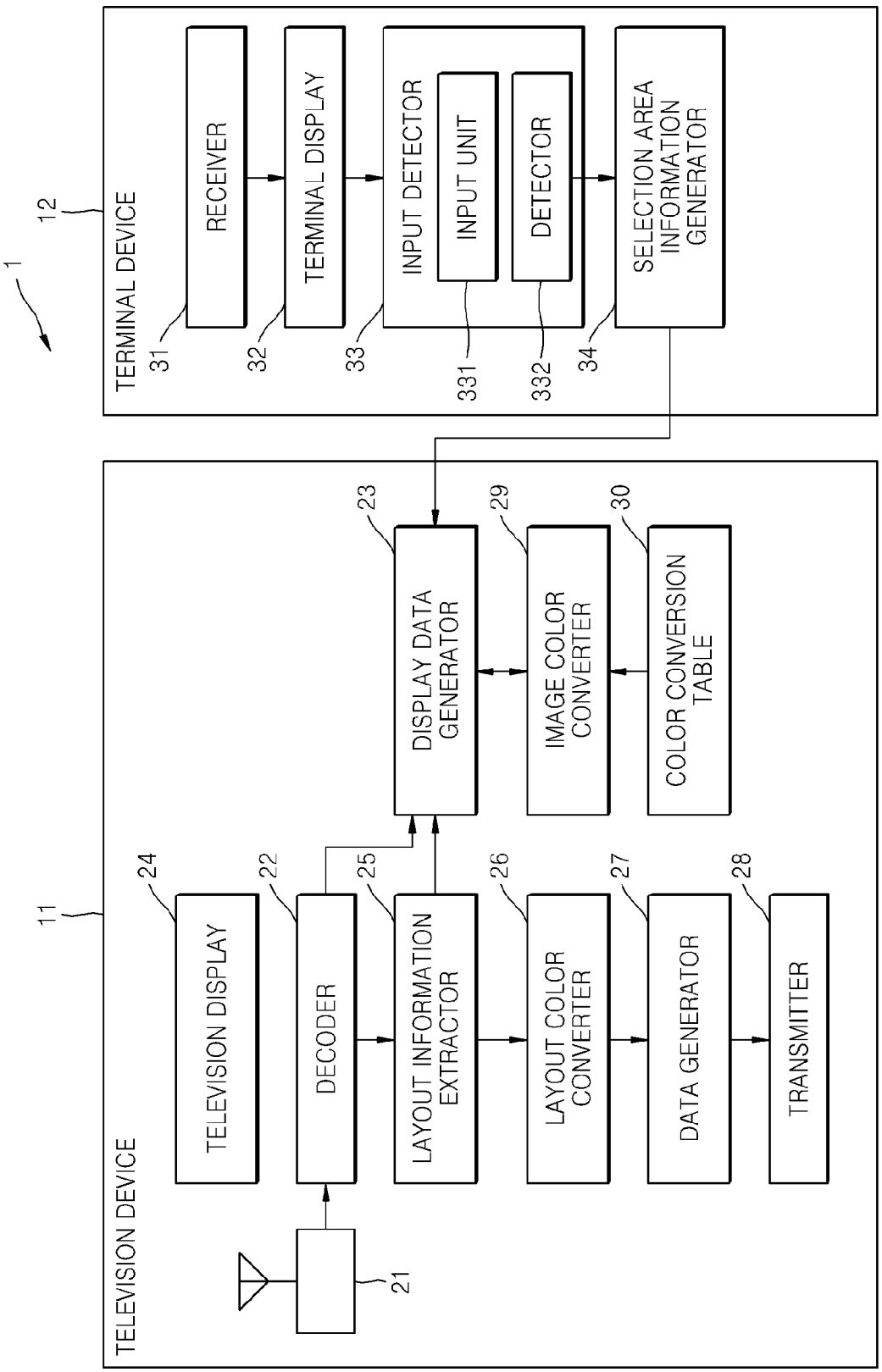
FIG. 1 is a block diagram illustrating a configuration of a television system according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a block diagram illustrating a configuration of a television system 1 according to an exemplary embodiment.

The television system 1 includes a television device 11 and a terminal device 12. The television device 11 includes a receiver 21, a decoder 22, a display data generator 23, a television display 24, a layout information extractor 25, a layout color converter 26, a data generator 27, a transmitter 28, an image color converter 29, and a color conversion table 30.

The receiver 21 receives image data which is transmitted from an external transmission station. Image data, which may be received by the receiver 21, may include image information, broadcast content information, etc., and may be encoded to efficiently perform wireless transmission. Furthermore, digital broadcast signals may include voice data, but the processing of voice signals may be performed by using an existing technology, and thus the detailed description thereof is omitted here. The receiver 21 outputs received image data to the decoder 22.

The decoder 22 may decode image data inputted from the receiver 21 so as to generate decoded information. The decoder 22 may also output image data generated by decoding, and content information disclosed by a broadcast markup language (BML), to the display data generator 23. Furthermore, the decoder 22 may output the content information to the layout information extractor 25.

The display data generator 23 receives data from the decoder 22, the layout information extractor 25, and a selection area information generator 34. Particularly, the display data generator 23 receives decoded image data and content data information from the decoder 22. The display data generator 23 receives layout information from the layout information extractor 25. Furthermore, the display data generator 23 receives information on an area which is selected by the user from the selection area information generator 34.

The display data generator 23 generates display data based on data inputted from the decoder 22, the layout information extractor 25, and the selection area information generator 34, and outputs the generated display data to the image color converter 29. Furthermore, the display data generator 23 receives information after color conversion from the image color converter 29. The display data generator 23 generates an operating signal based on the generated display data and information generated after color conversion by the image color converter 29, and outputs the operating signal to the television display 24.

Furthermore, when there is no area selection information input from the selection area information generator 34, the display data generator 23 may generate an operating signal to display on a television system based on the decoded information inputted from the decoder 22, and outputs the generated operating signal to the television display 24. In other words, the display data generator 23 may generate an operating signal to be presented as the original color which has been designated in the BML document, and outputs the operating signal to the television display 24.

The television display 24 may be a display which is operated based on an operating signal which is inputted from the display data generator 23.

The layout information extractor 25 may receive broadcast content information from the decoder 22. The layout information extractor 25 extracts layout information from the content information which may be disclosed as BML sentences. The layout information extractor 25 outputs the extracted layout information to the display data generator 23. Furthermore, the layout information extractor 25 may also output the layout information to the layout color converter 26.

Figure 2:
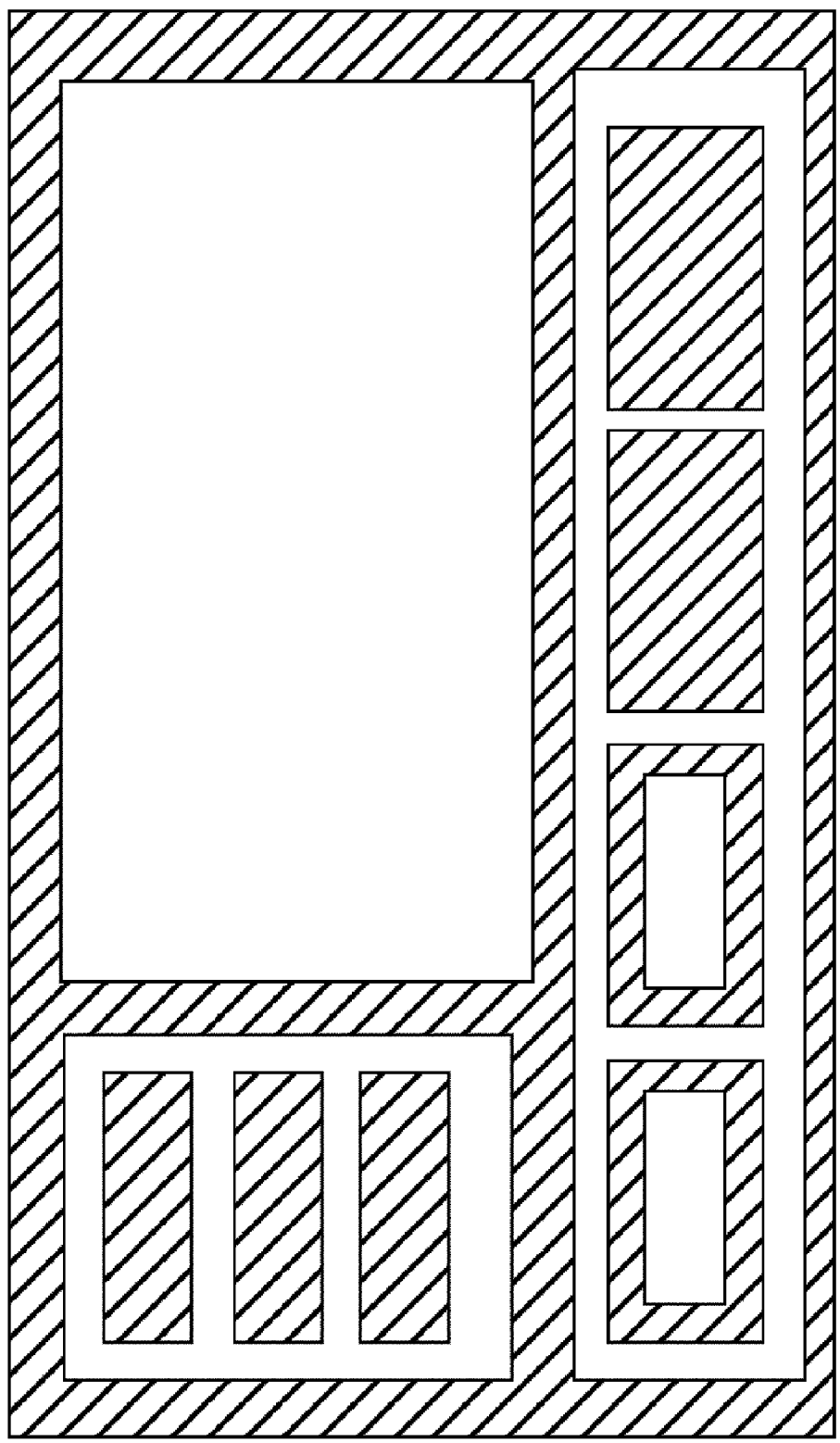
FIG. 2 is a diagram illustrating layout information after color conversion into two colors, according to an exemplary embodiment.
Figure 3:
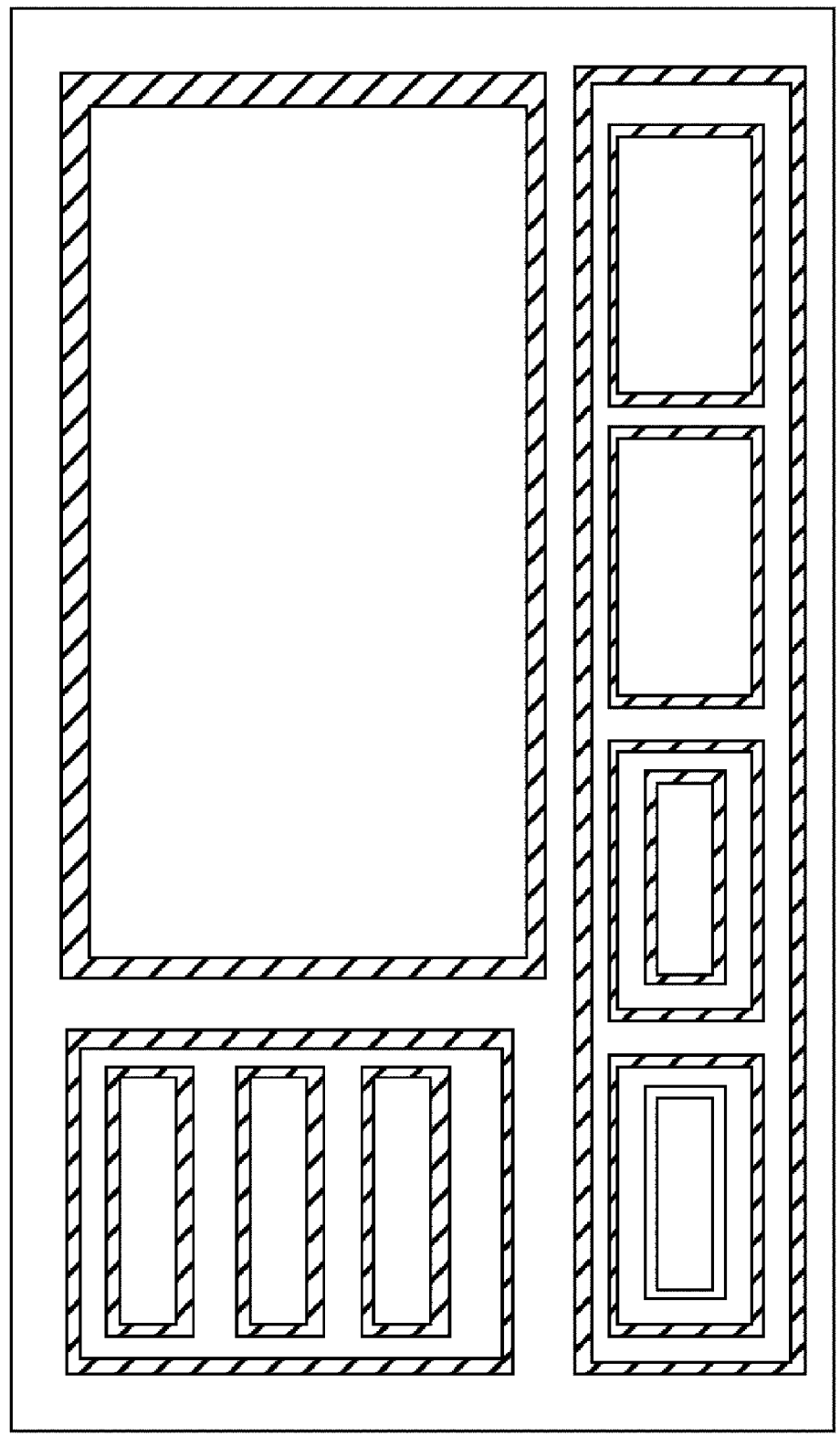
FIG. 3 is a diagram illustrating another example of layout information after color conversion into two colors, according to an exemplary embodiment.

The layout color converter 26 may receive layout information from the layout information extractor 25. The layout color converter 26 converts color information regarding content that is included in the layout information. Particularly, the layout color converter 26 may generate layout information after color conversion which color-converts the layout for persons with color vision deficiency. Specifically, the layout color converter 26 generates layout information after color conversion into the two colors of white and black is done. For example, FIG. 2 is a diagram illustrating layout information after color conversion into the two colors of white and black. FIG. 3 is a diagram illustrating another example of layout information after color conversion into the two colors of white and black. The layout color converter 26 may output this layout information to the data generator 27 after color conversion.

The data generator 27 generates display data, which may be displayed on the terminal device 12, based on layout information and color conversion which has been input from the layout color converter 26. The data generator 27 is usually an HTML data generator and generates an HTML document. The data generator 27 outputs the generated display data to the transmitter 28.

The transmitter 28 outputs display data, which is input from the data generator 27, to the terminal device 12. The transmitter 28 usually outputs an HTML document to the terminal device 12 according to HyperText Transfer Protocol (HTTP). As such, the television device 11 may function as a web server.

The image color converter 29 performs color conversion on the display data which is generated in the display data generator 23. In detail, the image color converter 29 may receive display data from the display data generator 23, and may generate information after performing color conversion on a selection area by using the color conversion table 30 and based on selection area information which is inputted from the selection area information generator 34. The image color converter 29 may therefore generate layout information after color conversion to the display data generator 23.

The color conversion table 30 provides color conversion rules to the image color converter 29. For example, a color conversion rule, which is provided by the color conversion table 30, contains a rule for converting a color, which is difficult to be recognized by a person with color vision deficiency, into a color which is easy to be recognized by the person with color vision deficiency.

The terminal device 12 may be a small and light portable terminal of a user. Some examples thereof are a smartphone and a tablet PC. The terminal device 12 may include a receiver 31, a terminal display 32, an input detector 33, and the selection area information generator 34.

The receiver 31 receives display data from the transmitter 28. The receiver 31 may then output the received display data to the terminal display 32.

The terminal display 32 is a display that has a screen that displays based on the display data which is input from the receiver 31. Here, the display data, which is input to the terminal display 32, may be an HTML document which discloses how to display the layout with the two colors of black and white. The terminal display 32 may display the layout which is expressed in two colors of black and white via the web browser.

The input detector 33 may include at least an input unit 331 and a detector 332.

Figure 4:
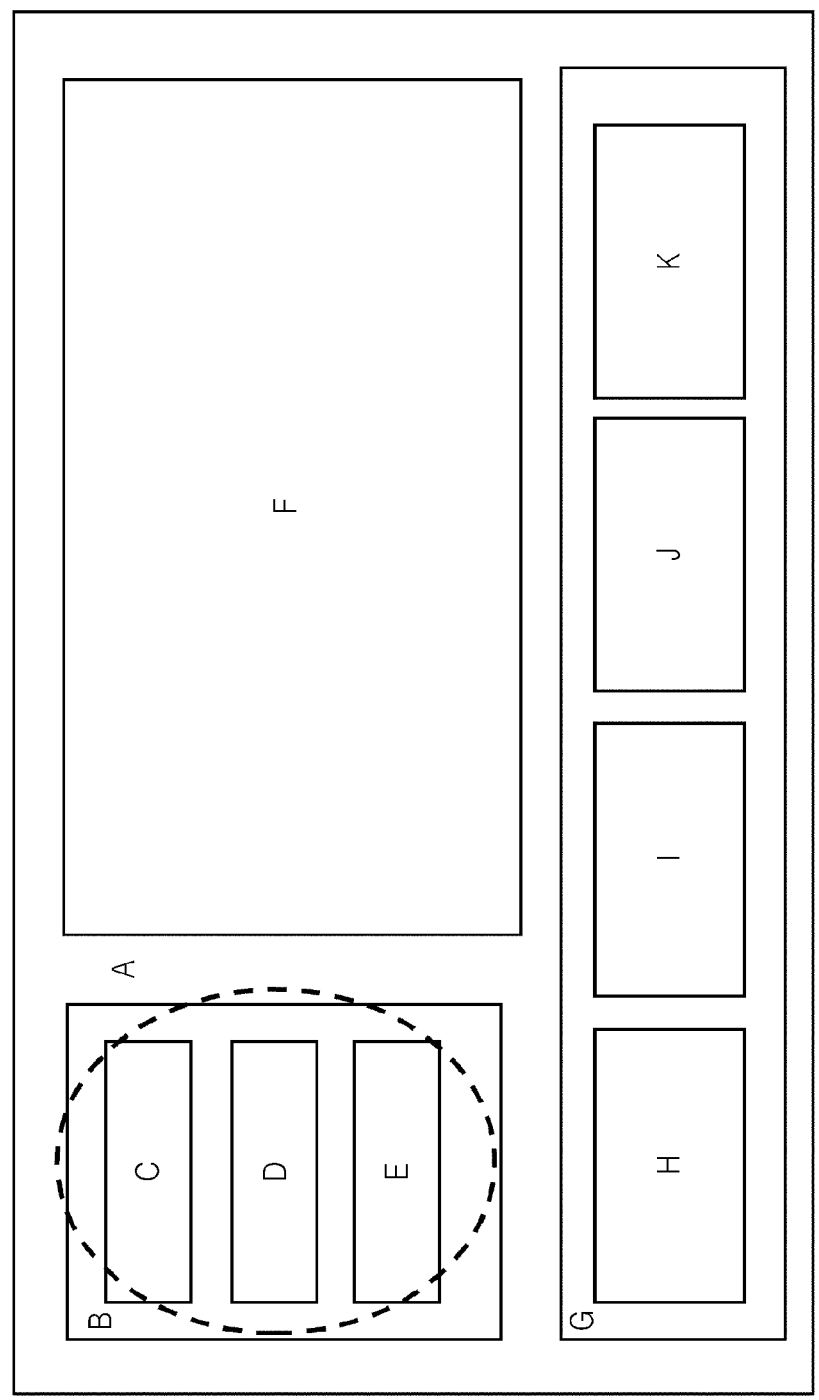
FIG. 4 is a diagram illustrating a case where an upper left area is selected in a display of a terminal device, according to an exemplary embodiment.

The input unit 331 is an input unit via which the user may provide an input. For example, the input unit 331 may be a touch panel which is implemented as a display screen. According to one exemplary embodiment, the user may compare the layout screen, which is displayed on the terminal display 32, with an image which is displayed on the television display 24, and input a desired range for color conversion by using the input unit 331. For example, the input unit 331 obtains a track of operation by the user. FIG. 4 is a diagram illustrating a case where the user selects an upper left area from the layout screen, which is displayed on the terminal display 32, and the circular dashed lines indicates the trace of the operation by the user.

The detector 332 detects a block element which is included in the trace based on the track which is input by the input unit 331. The detector 332 outputs information regarding the detected block element to the selection area information generator 34. Furthermore, the block element may be formed as rectangular areas for each element. In other words, the detector 332 outputs information regarding one or a plurality of rectangular areas to the selection area information generator 34.

The selection area information generator 34 generates selection area information based on information regarding the rectangular area which is inputted from the detector 332. The selection area information generator 34 outputs the selection area information to the display data generator 23. For example, the selection area information generator 34 may output the layout information corresponding to the selection area to the display data generator 23.

Figure 5:
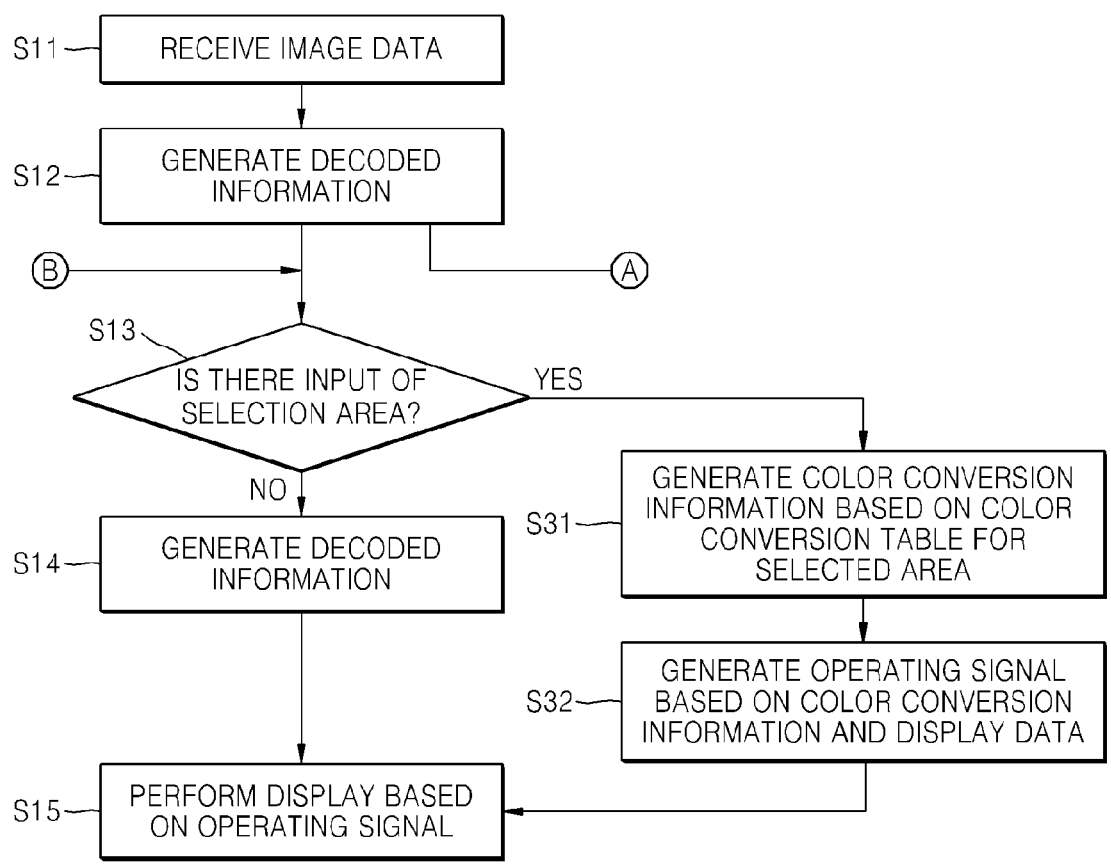
FIG. 5 is a flowchart of an operation of a television system, according to an exemplary embodiment.
Figure 6:
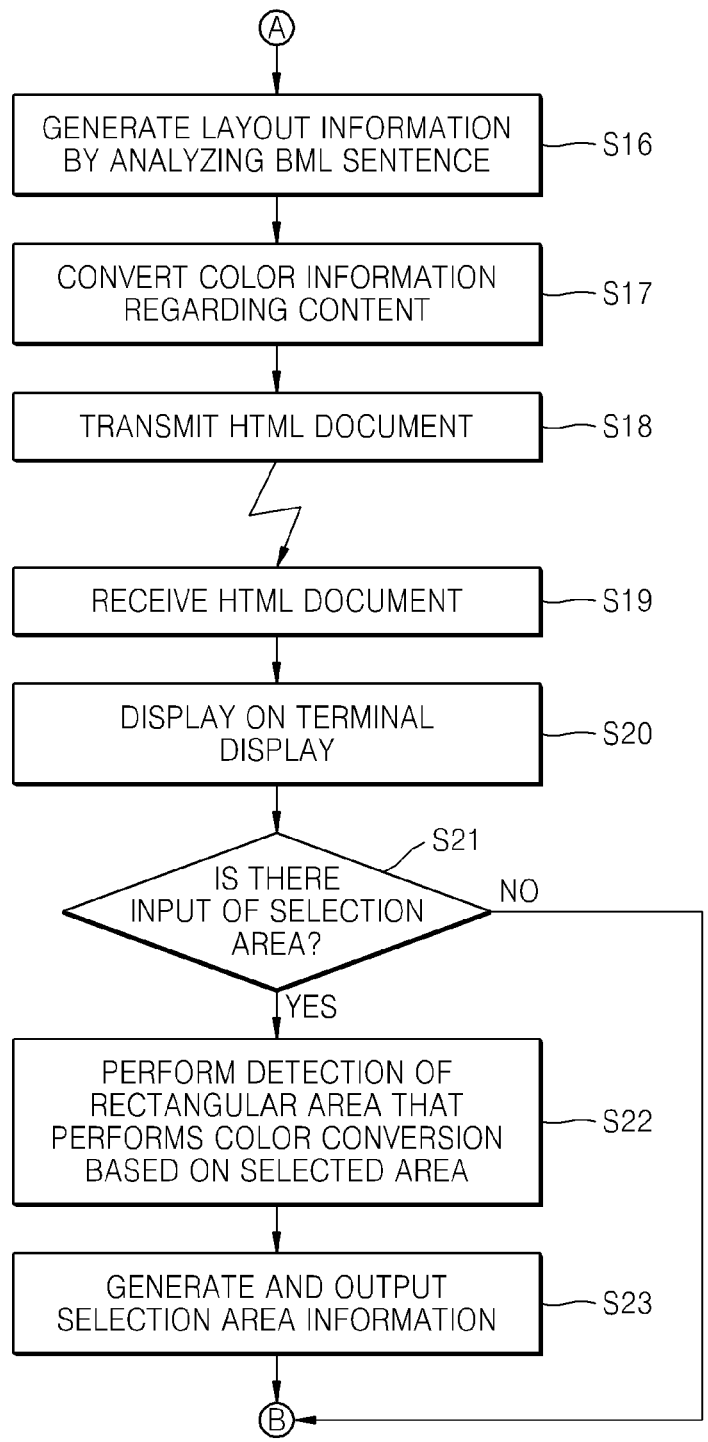
FIG. 6 is a flowchart of an operation of a television system, according to an exemplary embodiment.

Hereinafter, an operation of the television system 1 will be described. FIGS. 5 and 6 are flowcharts of an operation of the television system 1, according to one or more exemplary embodiments.

The receiver 21 receives image data which is transmitted from an external transmission station (S11).

The decoder 22 decodes image data, which is input from the receiver 21, so as to generate decoded information (S12). Thereafter, operations S13 and S16 are performed. Operations S13 and S16 may be simultaneously performed.

The television device 11 may determine an input state of the selection area information from the selection area information generator 34 to the display data generator 23 (S13). Operation S13 may be performed when data, which is input to the selection area information generator 34, is changed. When there is not input to the display data generator 23 from the selection area information generator 34 (No of S13), operation S14 is performed. Otherwise, when there is an input to the display data generator 23 from the selection area information generator 34 (Yes of S13), operation S31 is performed.

The display data generator 23 generates an operating signal based on decoded information which is input from the decoder 22 (S14).

The television display 23 displays the display data based on the operating signal (S15).

The layout information extractor 25 analyzes a BML sentence which is input from the decoder 22 (S16). In detail, the layout information extractor 25 extracts layout information through a rectangular area which is indicated by body element, div element, p element, object element, and input element, which are block elements, by analyzing the BML sentence. Furthermore, the layout information extractor 25 calculates the location of the rectangle from position features, and left, top, right, and bottom features which are designated in the BML sentence. Here, the layout information extractor 25 outputs the extracted layout information to the display data generator 23 and the layout color converter 26.

The layout color converter 26 converts color information regarding content (S17). In detail, the layout color converter 26 generates layout information after color conversion by rendering colors in the order of black, white, black, etc. from the parent elements in the layout regardless of the value which is disclosed in the color index and the background-color-index in the BML sentence.

FIG. 2 shows layout information after color conversion into two colors in an order from the parent elements. In FIG. 2, the portion, which is converted into black, is indicated by hatched oblique lines.

Here, when there is designation of the border-width in the BML sentence, the layout color converter 26 generates layout information after color conversion regardless of the values of a border-top-color-index, a border-right-color-index, a border-left-color-index, and a border-bottom-color-index. For example, when the parent element of the rectangular area having the designation of the border-with is colored in black, the layout color converter 26 colors the border in white, and colors the inner side in black. FIG. 3 shows layout information after coloring the border in white and coloring the inner side in black. In FIG. 3, the portion, which has been colored in white, is indicated by hatched oblique lines. In contrast, when the parent element is white, the layout color converter 26 may color the border in black, and color the inner side in white.

The data generator 27 generates an HTML document based on layout information after color conversion which is inputted from the layout color converter 26 and transmits the generated HTML document to the terminal device 12 (S18). In other words, the television device 11 publishes the layout information after color conversion as a web page illustrated in FIG. 2 or 3.

The receiver 31 of the terminal device 12 receives an HTML document (S19). In other words, the terminal device 12 obtains the web page which is published by the television device 11.

The terminal display 32 performs a display based on the disclosure of the HTML document (S20).

The terminal device 12 determines whether the user has input a desired range for color conversion by using the input unit 331 (S21). When input (Yes of S21) is provided, operation S22 is performed. When no input (No of operation S21) is provided, the process returns to operation S13.

The detector 332 performs detection of block elements for performing color conversion based on an input by the input unit 331 (S22). For example, when the trace, which is input by the user, is a circular dashed line of FIG. 4, the circle covers more than 50% of 4 rectangular areas (B, C, D, and E). Hence, the detector 332 determines that the user has selected the rectangular area (B, C, D, and E). Here, the detected rectangular area is considered as having a portion which is difficult to be viewed by the user. Furthermore, other rectangular areas (A, F, G, H, I, J, and K) have been selected by less than 50%, and thus the detection of the detector 332 is not performed.

The selection area information generator 34 writes the selection area information from the rectangular area which is detected by the detector 332, and outputs the information to the display data generator 23 as a user event (S23). Thereafter, the operation returns to operation S13.

When there is an input to the display data generator 23 from the selection area information generator 34 (Yes of S13), the image color converter 29 received an input of display data from the display data generator 23, and performs color conversion based on the color conversion table 30 for the area which is selected by the selection area information generator 34 (S31). The image color converter 29 prepares a color lookup table (CLUT), which is dedicated to a person with color vision deficiency, for CSS, PNG, MNG, and characters, and performs color conversion into a color which is different from the originally designated color. Furthermore, the image color converter 29 converts the decoded RGB value of JPEG into a color for a person with color vision deficiency, based on the color conversion table 30 which has been prepared in advance. Furthermore, when the currently selected selection area is different from the selection area where the previous color conversion was performed, the image color converter 29 returns the color of the previous color conversion area to the original color, and the color conversion is performed for only the currently selected selection area. The image color converter 29 outputs the color conversion information to the display data generator 23.

Figure 7:
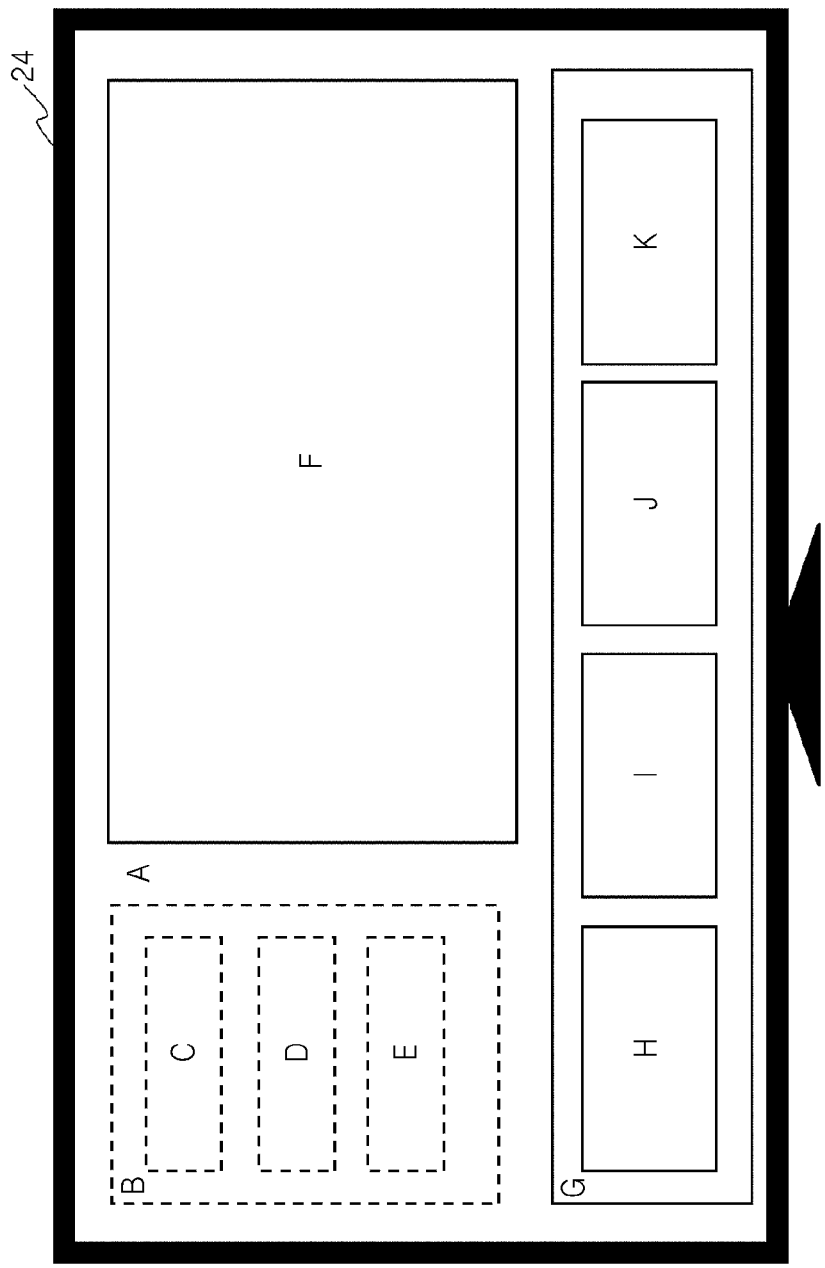
FIG. 7 is a diagram illustrating an example of a television display after color conversion, according to an exemplary embodiment.

The display data generator 23 generates an operating signal based on the color conversion information, which is input from the image color converter 29, and the display data (S32). Thereafter, operation S15 is performed. FIG. 7 shows an example of a screen of the television display 24 after color conversion of a selected area. In detail, FIG. 7 shows a state where a color change of the rectangular area (B, C, D, and E) of an upper left dashed line portion has been done.

As such, the color of the data broadcast of the selection area, which has been designated in the terminal device 12, is displayed in a converted state in the television device 11. At this time, the area, which has not been designated in the terminal device 12, is displayed in the original color itself in the television device 11. In other words, the color of the minimum area, which has been designated by the user, may be converted, and the image of the converted color may be displayed. Hence, when a person with color vision deficiency and a person without color vision deficiency simultaneously view the television device 11, the information desired by the person with the color vision deficiency may be easily obtained, and a person without the color vision deficiency may view an image whose color has been changed only a little.

Figure 8:
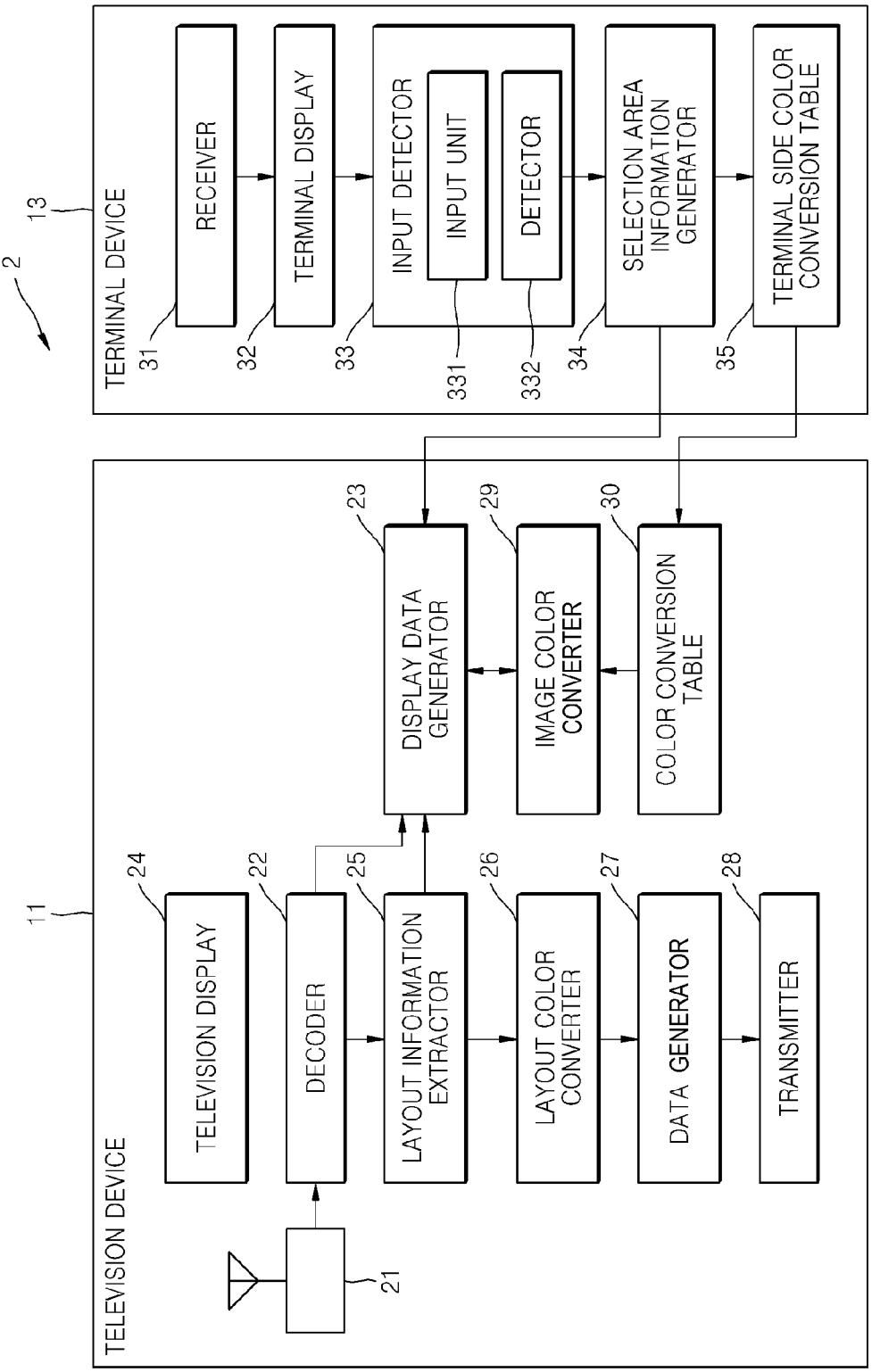
FIG. 8 is a block diagram illustrating a configuration of a television system, according to another exemplary embodiment.

FIG. 8 is a diagram illustrating a configuration of a television system 2 according to another exemplary embodiment. The television system 2 includes a television device 11 and a terminal device 13. Furthermore, the same reference numeral is given for components having similar functions as those of the television system 1 of the previous embodiment, and their descriptions thereof are omitted.

The terminal device 13 may include a receiver 31, a terminal display 32, an input detector 33, a selection area information generator 34, and a terminal side color conversion table 35.

The terminal side color conversion table 35 is a color conversion table which may be individually stored in the terminal device 13. For example, when each of a plurality of users has a portable terminal 13, the terminal side color conversion table 35 contains a color conversion rule which fits the characteristics of the user's color vision deficiency for each terminal device 13 which is held by the user. The terminal side color conversion table 35 outputs the content of the table to the color conversion table 30.

Figure 9:
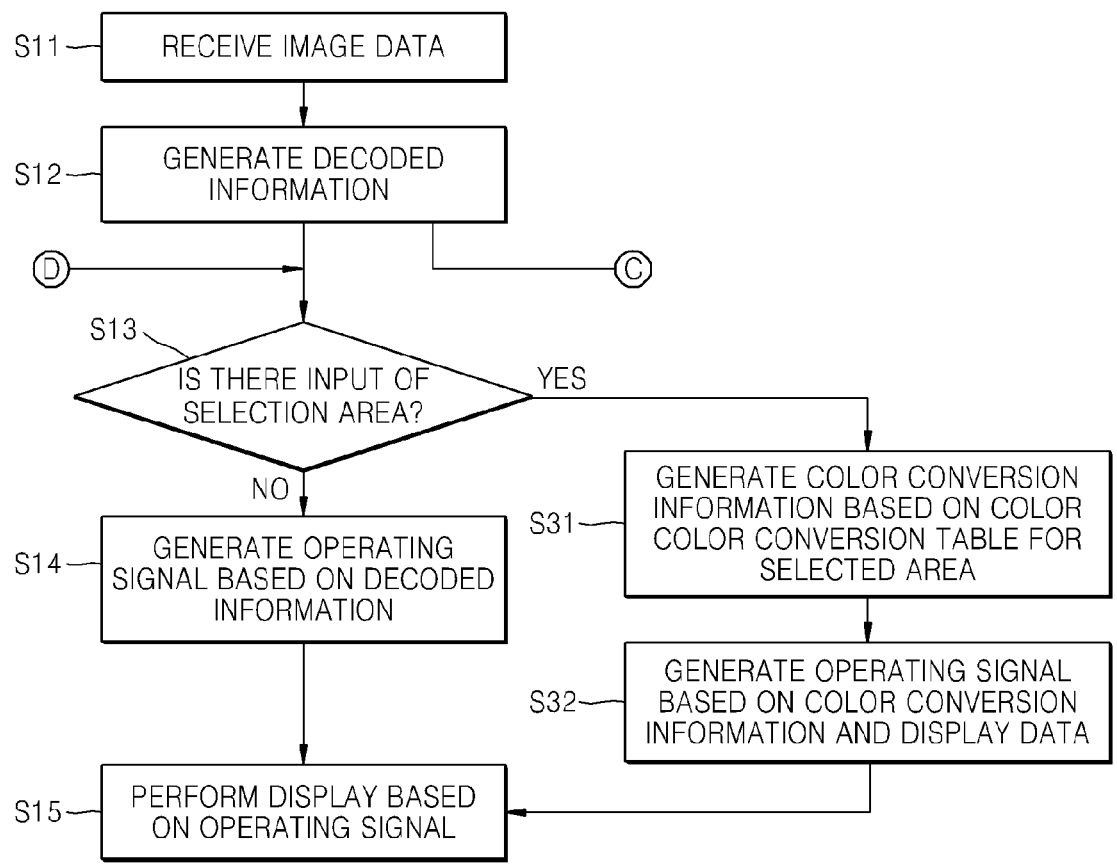
FIG. 9 is a flowchart of an operation of a television system, according to another exemplary embodiment.
Figure 10:
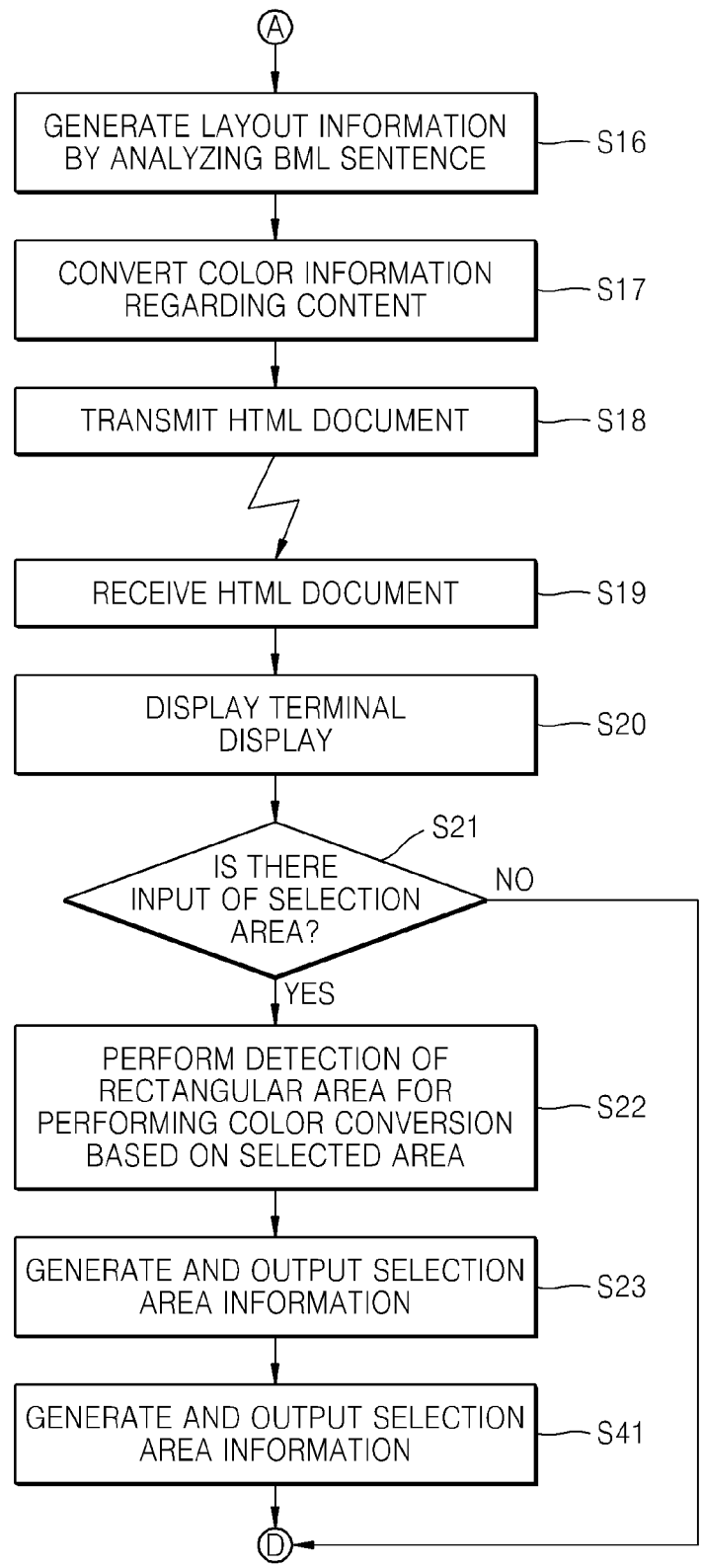
FIG. 10 is a flowchart of an operation of a television system, according to another exemplary embodiment.

Hereinafter, the operation of the television system 2 will be described. FIGS. 9 and 10 are flowcharts of an operation of the television system 2.

The receiver 21 receives image data which is transmitted from an external transmission station (S11).

The decoder 22 decodes image data, which may be input from the receiver 21, so as to generate decoded information (S12). Then operations S13 and S16 are performed. The process from operation S13 and the process from operation S16 may be simultaneously performed.

The television device 11 may determine an input state of information about the selection area from the selection area information generator 34 to the display data generator 23 (S13). When there is no input from the selection area information generator 34 to the display data generator 23 (No of S13), operation S14 may be performed. Otherwise, when there is an input from the selection area information generator 34 to the display data generator 23 (Yes of S13), operation S31 may be performed.

The display data generator 23 generates an operating signal based on information which is input from the decoder 22 (S14).

The television display 24 displays the display data based on the operating signal (S15).

The layout information extractor 25 analyzes a BML sentence which is input from the decoder 22 (S16).

The layout color converter 26 converts color information regarding content (S17).

The data generator 27 generates an HTML document based on the layout information after color conversion which is input from the layout color converter 26, and transmits the generated HTML document to the terminal device 13 (S18).

The receiver 31 of the terminal device 13 receives an HTML document (S19).

The terminal display 32 performs a display based on the disclosure of the HTML (S20).

The terminal device 13 determines whether the user has input a desired range for color conversion by using the input unit (S21). When the user has provided an input (Yes of S21), operation S22 may be performed. Otherwise, when the user has not provided an input (No of operation S21), the process may return to operation S13.

The detector 332 performs detection of block elements for performing color conversion based on an input by the input unit 331 (S22).

The selection area information generator 34 generates the selection area information from the rectangular area detected by the detector 332, and outputs the information, as the user event, to the display data generator 23 (S23).

The terminal side color conversion table 35 outputs the content of the table to the color conversion table 30 (S41). Thereafter, the process returns to operation S13.

The image color converter 29 inputs display data from the display data generator 23, and generates color conversion information based on the color conversion table 30 for the area which is selected by the selection area information generator 34 (S31). That is, the image color converter 29 generates color conversion information based on the color conversion rule which is stored in the terminal side color conversion table 35.

The display data generator 23 generates an operating signal based on new display data which is generated by performing color conversion of the selection area for the display data which is input from the decoder 22 according to color conversion information which is input from the image color converter 29 (S32). Thereafter, operation S15 is performed.

As such, the color of the data broadcast of the selection area which is designated in the terminal device 12 is converted and displayed on the television device 11. At this time, the color conversion is performed based on the conversion rule which fits the characteristics of the person with color vision deficiency, which have been stored in the terminal device 13, in the television device 11, and thus images, which are easily recognized by the person with color vision deficiency, may be displayed.

Furthermore, one or more embodiments are not limited to the above description, and may be appropriately changed. For example, in the above-described operation, the television device always becomes a state which is operated as a web server, but the On or Off of the function as the web server may be switched, and the procedure after operation S16 may be performed by turning on the function only when performing the setting change of the color conversion. Furthermore, it was described above that the layout color converter 26 is prepared in the television device 11, and the color is converted into two colors of black and white so as to be output to the terminal device 12, but the layout color converter 26 may be prepared within the terminal device 12 and color conversion may be performed by the terminal device 12 so as to be displayed on the terminal display 32.

Furthermore, according to another exemplary embodiment, after outputting the color conversion rule, which is stored in the terminal side color conversion table 35, to the color conversion table 30, the image color converter 29 refers to the color conversion table 30, but the color conversion rule may be directly output from the terminal side color conversion table 35 to the image color converter 29. The detector 332 has detected the area, which contains more than 50% of the rectangular area, as the selection area, but the threshold value may be a value other than 50%, and may be arbitrarily set by the user.

As described above, according to the one or more of the above exemplary embodiments, images, which enable a person with color vision deficiency to easily obtain desired information while allowing a person without color vision deficiency to comfortably enjoy the images, may be displayed.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A television device comprising:
an image color converter configured to generate image data, after color conversion, wherein the image data is configured for color conversion suited for a person with a color vision deficiency for an area which is selected from a screen layout based on selection area information received from a terminal device which selects the area from the screen layout, and wherein the image data retains original colors for a remaining area of the screen layout other than the area which is selected based on the selection area information;
a display data generator configured to generate display data based on the image data and color conversion information which is generated by the image color converter;

a display configured to display the display data; and a layout information extractor configured to extract layout information corresponding to the screen layout of the image data.

2. The television device of claim 1, further comprising:
a layout color converter configured to generate the layout information, after color conversion, for each area of the screen layout such that a user with color vision deficiency may recognize the screen layout by using the layout information which is extracted from the layout extractor.

3. The television device of claim 1, wherein the terminal device is configured to receive a user's area selection operation, and generate the selection area information regarding the area from the screen layout.

4. The television device of claim 1, further comprising:
a data generator configured to generate an HTML document based on layout information after the color conversion which is generated by the layout color converter.

5. The television device of claim 1, further comprising:
a color conversion table configured to store a color conversion rule which performs the color conversion for the person with the color vision deficiency on the selected area,
wherein the image color converter is further configured to generate the color conversion information based on the color conversion rule of the color conversion table.

6. A television system comprising:
a television device comprising:
a display data generator configured to generate display data based on image data,
a display configured to display the display data, and
a layout information extractor configured to extract information regarding a screen layout from the image data as layout information; and
a terminal device configured to receive an area selection operation of a user and generate selection area information regarding the selected area from the screen layout,
wherein the television device further comprises an image color converter configured to generate the image data after color conversion for a person with a color vision deficiency for the image data within an area which is selected from a screen layout based on the selection area information received from the terminal device,
wherein the image data retains original colors for a remaining area of the screen layout other than the selected area, and
wherein the display data generator is configured to generate the display data further based on color conversion information which is generated in the image color converter.

7. The television system of claim 6,
wherein the television device further comprises a layout color converter configured to generate the layout information after color conversion of each area of the screen layout so that a user with the color vision deficiency may recognize the screen layout by using the layout information which is extracted from the layout extractor, and
wherein the terminal device further comprises a terminal display configured to display a color-converted screen layout based on the layout information after the color conversion.

8. The television system of claim 6, wherein the layout color converter is configured to generate the layout information after color conversion into black and white.

9. The television system of claim 7, wherein the terminal device further comprises:
an input unit configured to input a range of color conversion which is desired by a user while viewing the screen of the layout after color conversion which is displayed on the terminal display; and
a detector configured to detect a block element which is included in a desired range which the user has input by using the input unit,
wherein the selection area information generator is configured to generate selection area information based on the block element which is detected by the detector.

10. The television system of claim 7,
wherein the television device further comprises a data generator configured to generate an HTML document based on layout information after the color conversion which is generated by the layout color converter, and
wherein the terminal display is configured to perform a screen display using a web browser.

11. The television system of claim 7,
wherein the television device further comprises a color conversion table that stores a color conversion rule configured to perform color conversion for a person with a color vision deficiency on the selected area, and
wherein the image color converter is configured to generate the color conversion information based on the color conversion rule of the color conversion table.

12. The television system of claim 7,
wherein the terminal device further comprises a terminal side color conversion table that stores a color conversion rule that is changed for each terminal device, and
wherein the image color converter is configured to generate color conversion information based on the color conversion rule that is input from the terminal side color conversion table.

13. A method of displaying an image, the method comprising:
extracting layout information corresponding to a screen layout of image data;
generating color conversion information based on a color conversion table for the image data within an area that is selected based on selection area information received from a terminal device that has selected at least one area of a plurality of areas from the screen layout; and
generating display data by performing color conversion on the at least one area of the plurality of areas from the screen layout based on the color conversion information and the image data, wherein original colors are retained for remaining areas of the plurality of areas from the screen layout other than the at least one area.

14. The method of claim 13, further comprising:
generating the layout information after color conversion of each area within the screen layout so that a user with a color vision deficiency may recognize the screen layout by using the layout information.

15. A display system comprising:
a terminal device configured to receive an area selection from the user; and
a television device configured to:
receive image data,
convert the image data based on the area selection by the user and color conversion data for a person with a color vision deficiency, wherein original colors are retained for a remaining area of the image data other than the area selection, and display the converted image data.

16. A method of converting and displaying an image, the method comprising:

receiving image data and a user area selection;

converting the image data based on the user area selection using a color conversion table for a person with a color vision deficiency, wherein original colors are retained for a remaining area of the image data other than the user area selection; and outputting the converted image data.

\* \* \* \* \*